United States Patent [19]

Nordstrom et al.

[11] 4,170,268
[45] Oct. 9, 1979

[54] APPARATUS FOR WEIGHING RAILWAY SUPPORTED VEHICLES

[75] Inventors: Kjell H. Nordstrå Rune N. A. Flinth, both of Västerås, Sweden

[73] Assignee: Flintab AB, Västerås, Sweden

[21] Appl. No.: 790,100

[22] Filed: Apr. 22, 1977

[51] Int. Cl.² ............................................ G01G 19/04
[52] U.S. Cl. ..................................... 177/163; 177/211
[58] Field of Search ............... 177/163, 133, 134, 135, 177/211, DIG. 9, 1, DIG. 8

[56] References Cited

U.S. PATENT DOCUMENTS

| | | | |
|---|---|---|---|
| 2,339,152 | 1/1944 | Connelly | 177/163 X |
| 2,597,751 | 5/1952 | Ruge | 177/211 X |
| 2,899,191 | 8/1957 | Hunt | 177/211 |
| 4,036,315 | 7/1977 | Flinth | 177/163 X |

*Primary Examiner*—Joseph W. Hartary

[57] ABSTRACT

A method and apparatus for determining the weight of a railway supported vehicle. A pair of spaced apart rails which are engageable with wheels of the vehicle are supported by a longitudinally extending sleeper or tie member which extends transversely to the rails and which is disposed beneath the rails and extends outwardly of both sides of the rails. The longitudinal end portions of the sleeper member which are disposed outwardly of the pair of spaced apart rails are supported in a manner which allows deflection of the sleeper member in response to forces applied thereto by the rails. A means is provided for providing a signal which varies as a function of the strain in the sleeper, which means preferably measures either the shear strain or the bending strain in the sleeper. The signal is then processed to provide an indication of the weight of the vehicle supported on the rails.

10 Claims, 6 Drawing Figures

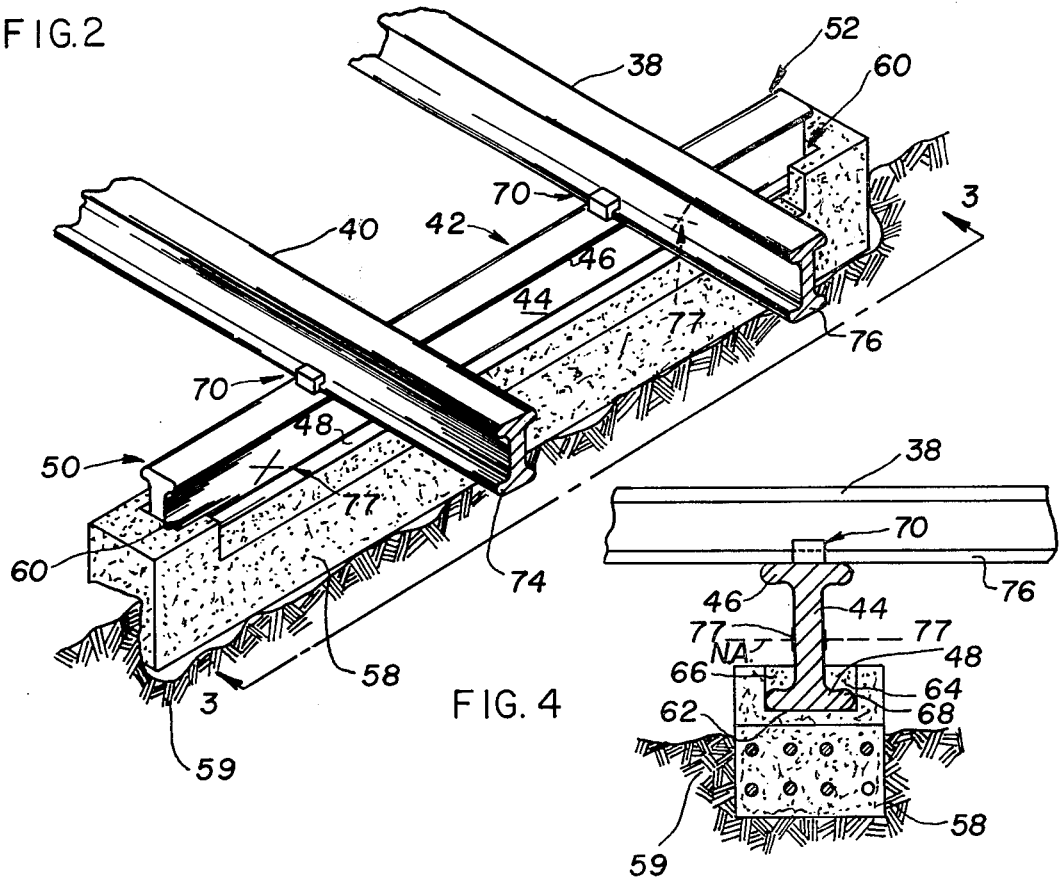
FIG. 2
FIG. 4
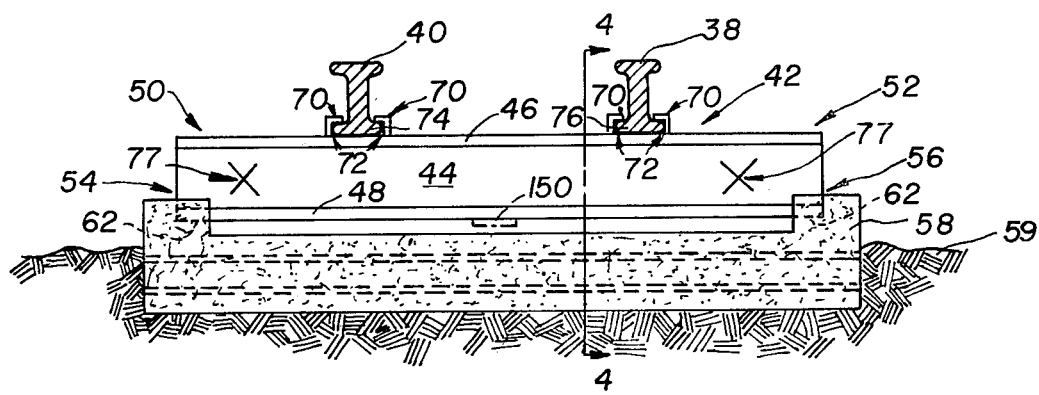
FIG. 3

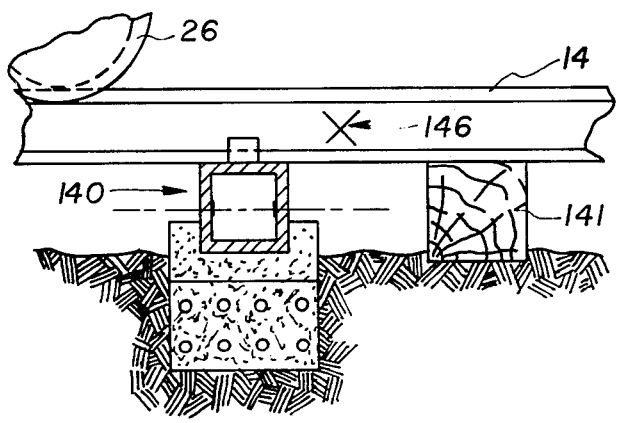
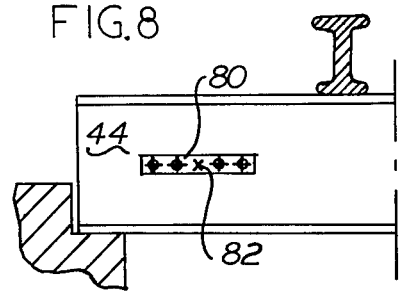
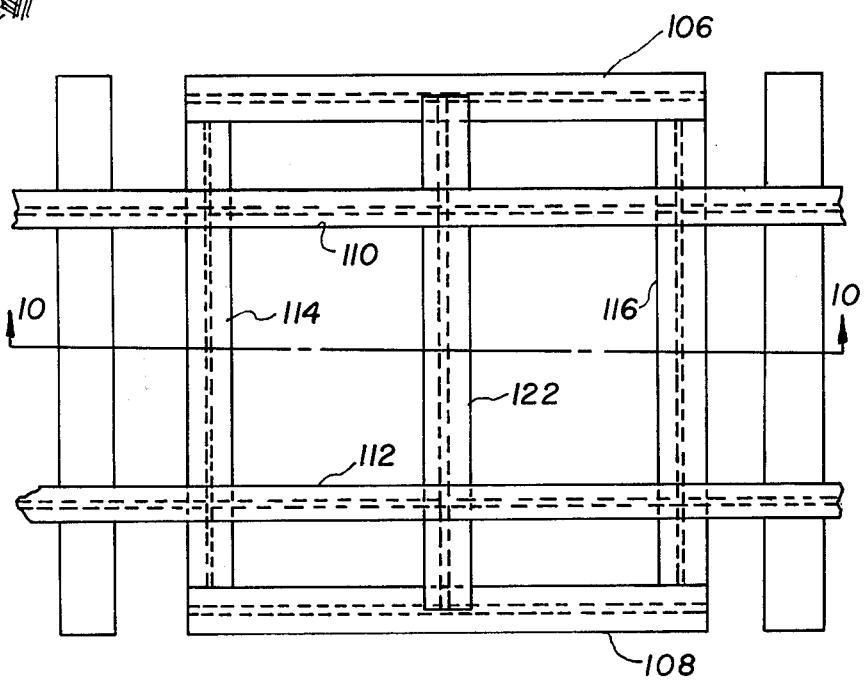
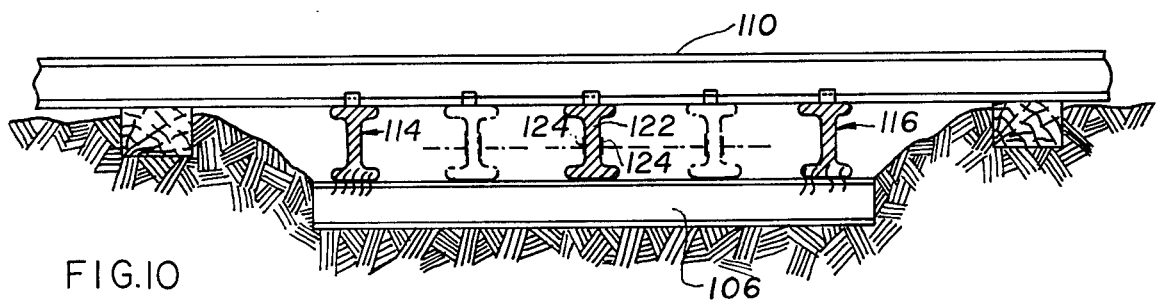

APPARATUS FOR WEIGHING RAILWAY SUPPORTED VEHICLES

BACKGROUND OF THE INVENTION

The present invention relates to a method and apparatus for statically or dynamically determining the weight of a railway supported vehicle. The present invention is believed to provide a method and apparatus which are particularly advantageous for weighing rail supported vehicles which carry material such as molten metal which is often subject to spillage, and which material can do substantial damage to elements of a weighing system when it comes into contact therewith.

Railway supported vehicles known as torpedo cars are often used to transport molten metal from an open hearth furnace to a basic oxygen furnace. Such torpedo cars are generally very long and are designed to support great weights of molten metal. During filling and movement of the vehicle there is often considerable spillage of molten metal onto the railway structure. Such molten metal can, and does, do considerable damage to the railway structure. Damage caused by molten metal often requires replacement of the standard ties or sleepers which support the rails, and can also necessitate replacement of sections of the rails themselves. Where vehicle weighing systems are involved, such problems may be even more acute, because the systems often include highly sensitive portions which can be damaged by molten material more quickly than standard railway support structure.

One type of weighing system which is particularly suitable for weighing vehicles such as torpedo cars is disclosed in U.S. application Ser. No. 730,074, filed Oct. 6, 1976, now Pat. No. 4,036,315. According to this disclosure the weighing system includes pairs of weighing platforms which replace portions of the rails. The pairs of platforms are spaced apart along the length of the rails by a distance which is equal to the distance between the forward and rear axles of the torpedo car. The size and spacing of the weighing platforms are such that one weighing platform engages the wheels supported on a fraction of the axles at the forward end of the torpedo car and the other weighing platform engages the wheels supported on a fraction of the axles at the rear end of the torpedo car. Respective foundations are provided for supporting the wheels which are not in contact with the weighing platforms. Interposed between the respective platforms and the foundation are load cells which provide signals which vary as a function of the load applied to the platform and, the signals from the load cells are electrically processed to provide an indication of the total weight of the load carried by the torpedo car. In the foregoing, problems due to spillage are minimized because the platforms are small enough to support only a fraction of the wheels of each end of the car, and because the platforms are spaced apart by a considerable distance due to the overall length of the torpedo car.

In the art there have also been numerous other types of railway vehicle weighing devices disclosed, though not necessarily directed specifically toward weighing torpedo cars. For example, various disclosures of weighing devices can be found in the form of platforms which are intended to effectively replace sections of the rails for supporting the railway vehicle wheels. Such types of devices can be found in disclosures such as U.S. Pat. Nos. 3,714,997 and 3,734,217. Still other examples of railway vehicle weighing devices include weigh rails which replace a portion of the standard rails. Such type of vehicle weighing devices can be found in disclosures such as U.S. Pat. Nos. 3,734,216, 3,741,327 and 3,747,715.

In addition, other types of prior art railway vehicle weighing devices can be found in disclosures such as U.S. Pat. Nos. 3,004,152, 3,085,642 and 3,159,227; British Pat. Nos. 820,969, 797,161, and 832,389; German Pat. No. DBP/1,079,338; French Pat. Nos. 1,292,587 and 974, 974; and Swedish Pat. No. 217,810.

SUMMARY OF THE INVENTION

The present invention provides a method and apparatus for weighing railway guided vehicles, which method and apparatus are believed to represent a significant departure from the railway vehicle weighing systems disclosed in the prior art. In addition, the present invention is believed to provide a method and apparatus which are particularly advantageous for weighing vehicles such as torpedo cars which handle materials which can do considerable damage to the elements of the vehicle weighing system.

One aspect of the present invention relates to an apparatus for weighing a rail supported vehicle. A pair of spaced apart rails which are engageable with wheels of the vehicle are supported by a longitudinally extending sleeper or tie member which extends transversely to the rails and which is disposed beneath the rails and extends outwardly of both sides of the rails. The longitudinal end portions of the sleeper member which are disposed outwardly of the pair of spaced apart rails are supported in a manner which allows deflection of the sleeper member in response to forces applied thereto by the rails. A means is provided for providing a signal which varies as a function of the strain in the sleeper, which means preferably measures either the shear strain or the bending strain in the sleeper. The signal can be processed in accordance with known principles to provide an indication of the weight of the vehicle supported on the rails.

The present invention further provides sleeper members having configurations which provide some degree of protection for the delicate strain sensing elements in the event of molten metal spillage, and further provides for supporting the sleepers themselves in a manner which allows ready replacement thereof in the event of damage to the sleeper member.

The present invention also provides a weighing system which is believed to have particular advantages for obtaining static weighing of a railway vehicle which is being filled with material, particularly molten metal. The weigh system is constructed with a predetermined longitudinally extending section of the rails defining a weigh section, and a plurality of strain sensing sleeper members are disposed beneath the rails forming the weigh section. Such a system may be easily constructed, and the sleepers can be readily removed and replaced if they are damaged by spillage. The weigh section can be constructed to extend over a substantial length of rails, and this facilitates proper positioning of a torpedo car thereon.

The present invention further provides an improved method of weighing a railway vehicle such as a torpedo car, by measuring strain in a sleeper member disposed transverse to the rail sections and including end portions which are disposed outwardly of the rail sections and are supported in a manner which allows deflection of the sleeper member under the weight of the rails and any load supported thereon.

BRIEF DESCRIPTION OF THE DRAWINGS

Further features and advantages of the present invention will become further apparent from the following detailed description taken with reference to the accompanying drawings wherein:

FIG. 2 is a perspective illustration of a vehicle weighing device constructed in accordance with the principles of the present invention;

FIG. 3 is a view of the device of FIG. 2, taken from the direction 3—3;

FIG. 4 is a sectional view of the device of FIG. 3, taken from the direction 4—4;

FIG. 8 is an enlarged sectional view of a portion of a weigh device similar to that shown in FIGS. 2-4 and illustrating particular features of a device for sensing strain in accordance with this invention;

FIG. 9 is a top view of a modified form of weigh device constructed in accordance with the principles of this invention;

FIG. 10 is a side view of the device of FIG. 9, taken from the direction 10—10;

FIG. 11 is an enlarged view of a section 12—12 of the rails of FIG. 1, and showing a further aspect of the present invention.

DETAILED DESCRIPTION OF THE PREFERRED EMBODIMENT

As noted above, the present invention relates to an apparatus and method which are believed to have particular advantages for determining the weight of a railway such as a torpedo car for carrying molten material. In the description which follows, the principles of this invention are disclosed for weighing a torpedo car for carrying molten metal. However, the manner in which the principles of this invention may be applicable for the weighing of numerous other types of railway supported vehicles will be readily apparent to those of ordinary skill in the art.

Figure 1:
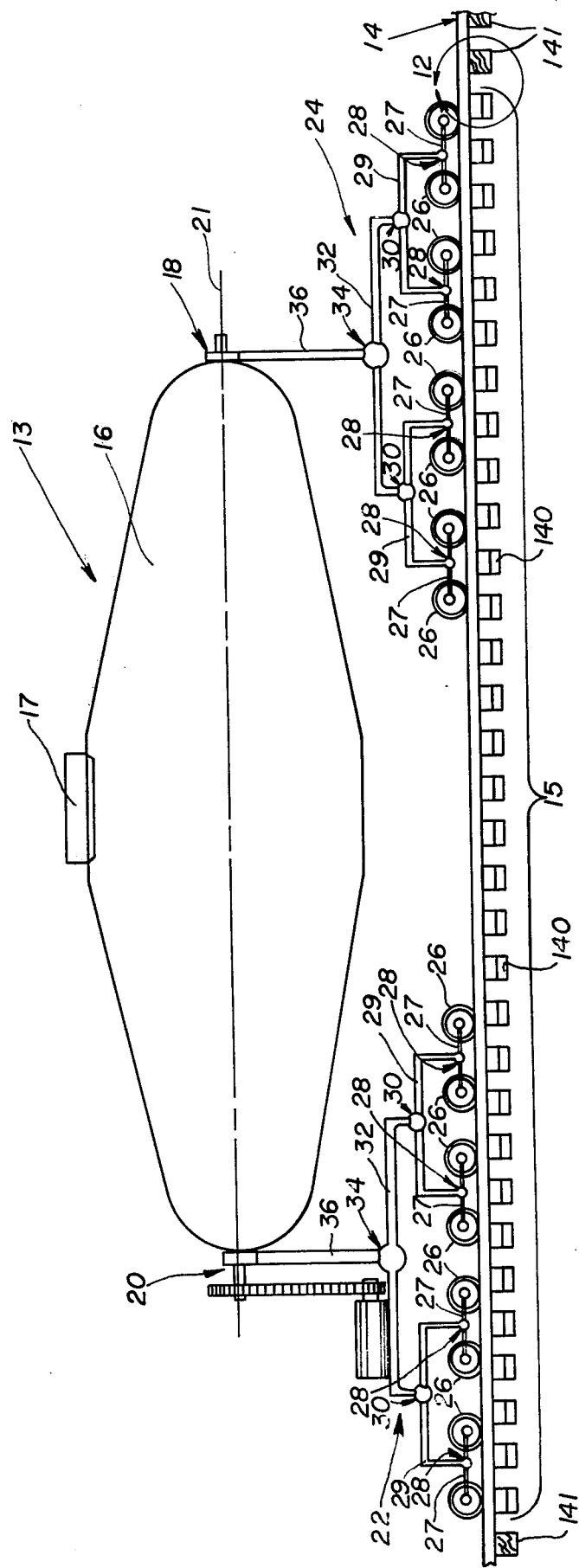
FIG. 1 is a schematic illustration of a torpedo vehicle supported on a vehicle weighing system constructed according to the principles of the present invention.

In FIG. 1 a torpedo car 13 is supported on a longitudinally extending length of rails 14 forming part of a weigh section 15. The torpedo car includes a tank 16 which is designed to receive and support a body of liquid such as molten metal. The car includes a fill opening 17 which receives the molten metal. The car further includes bearings, represented schematically at 18 and 20 which support the car for rotation about an axis 21 in order to effect emptying of the molten material from the car at desired locations.

The opposite ends of the torpedo car 13 are supported by bogeys 22 and 24. Bogeys 22 and 24 may be of known construction, and in the disclosed embodiment each bogey includes eight axles, each of which connects a pair of wheels 26. The bogeys further include supports 27 connecting pairs of wheels 26 along each rail. Pivotal joints shown schematically at 28 connect supports 27 to additional supports 29. Supports 29 are further connected through pivotal joints 30 with still further supports 32 which, in turn, are pivotally connected at 34 with vertically extending supports 36. Vertically extending supports 36 are connected with the bearings 18 and 20 which are associated with the ends of the tank 16. By means of the foregoing construction, the wheels of the bogeys can readily traverse curves and the like, and the bogeys can also pivot in a vertical plane to allow the car 13 to traverse horizontally uneven rails.

Further structural details of torpedo cars can be found in disclosures such as U.S. Pat. application Ser. No. 730,074 and in various other known disclosures. The specific construction of the torpedo car, or of any railway vehicle which can be weighed by the present invention, forms no part of this invention and therefore need not be described in any further detail.

FIG. 2 broadly illustrates a weigh device constructed in accordance with the broad principles of the present invention. The weigh device includes a pair of spaced apart rails 38 and 40 of conventional construction, which are preferably parallel, and which support and guide the wheels of the railway vehicle.

A longitudinally extending tie or sleeper member 42 is disposed beneath the rails 38 and 40 and extends outwardly of the spaced apart rails 38 and 40 as would a standard tie or sleeper. The sleeper member 42 is formed by a metal I-beam member having a vertical web 44 disposed between a pair of horizontal flanges 46 and 48 (standard type ties or sleepers are generally formed of wood and are conventionally embedded in ballast, or are fixed to a concrete support).

The longitudinal ends 50 and 52 of the sleeper member which are disposed outwardly of the rails 38 and 40 and are supported by means of respective support structures 54 and 56 which are also disposed outwardly of the rails. In the embodiment of FIG. 2, both support structures 54 and 56 are integrally formed in a concrete support member 58 which extends transverse to the rails, and which is embedded in ballast 59 or secured to a concrete floor foundation in a known manner. Each support structure 54 and 56 is formed by a notch 60 in the concrete member 58. Each notch 60 includes a bottom surface 62, a vertical end surface 64 and a pair of vertical side surfaces 66 and 68. Each bottom surface 62 freely (i.e., slidably) supports the flange 48 of the end of the I-beam sleeper member 42. The end surfaces 64, however, combine to resist longitudinal movement of the I-beam member. The vertical side surfaces 66 and 68 of each support structure resist lateral movement of the ends of the I-beam sleeper member.

As shown in FIGS. 2 and 3 the rails 38 and 40 are secured to the I-beam sleeper member 42 in a manner similar to the way they would be secured to a standard sleeper. As illustrated, clamp type members 70 are fixed to the sleeper member 42 and include channel portions 72 which clampingly engage the lower flanges 74 and 76 of the rails 38 and 40 to resist relative vertical movement between the rails and the sleeper member. Thus, according to the foregoing construction, the I-beam shaped sleeper member 42 is designed to deflect under the weight of the rails and of course under the combined weight of the rails and any vehicle supported thereupon.

The invention includes means which provide a signal which varies in accordance with the strain in the sleeper member as a result of the forces applied thereto by the rails. In FIGS. 2-4 a strain sensing member (schematically shown at 77) includes resistance elements which are disposed at 45° angles to the neutral axis N.A. of the I-beam sleeper member 42. As seen in FIG. 4 a strain sensing member 77 is disposed on each side of the web 44 of the I-beam member, and as seen in FIG. 3 the strain sensing members 77 are also disposed outwardly of the rails, at a location between the rails 38 and 40 and the respective support structures 54 and 56.

The strain sensing members 77 are shown somewhat schematically throughout the drawings, because such strain sensing members can be constructed in accordance with known principles. For example, U.S. Pat. Nos. 3,734,217 and 3,741,327 disclose more specifically the construction of the types of construction of strain sensing members 77 which can be employed to sense the strain in the sleeper member.

The electrical signals produced by the strain sensing members 77 can be processed in accordance with known techniques in a suitable electronic system to provide an indication of the weight of the vehicle supported on the rails. The manner in which such processing can be accomplished therefore requires no further detailed explanation.

The upper flange 46 of the shaped I-beam sleeper member illustrated in FIGS. 2-4 provides at least some degree of protection of the strain sensing members 77 against spillage of molten material from a torpedo car. However, it is very difficult to avoid eventual damage to the sleepers and/or the strain sensing members because of the considerable spillage which often takes place during filling and transporting of molten material. When a sleeper member becomes irrevocably damaged the section or rails which it supports can be raised in a known manner, and the entire sleeper, which is freely supported in the notches 60 in the support member 58, can be removed and replaced with another sleeper member and new strain sensing members can be affixed thereto.

The strain sensing members 77 may be fixed directly to the web of the I-beam sleeper member as shown in FIGS. 2-4. In the modified construction shown in FIG. 8, a metal plate 80 may be bolted to the web 44 of the I-beam, and the strain sensing element 82 may be fixedly secured to the plate 80. The plate 80 will strain in proportion to the strain in the I-beam web 44, and the strain sensing member 82 will measure that strain and provide an output signal indicative of that strain.

The strain sensing element may also be of a design similar to that shown in U.S. Pat. No. 3,986,254. The housing affords additional protection to the strain sensing member and in the event that only the strain sensing member becomes damaged, the plate, the strain sensing element and the housing (including the compressible material) can be readily replaced.

Figure 5:
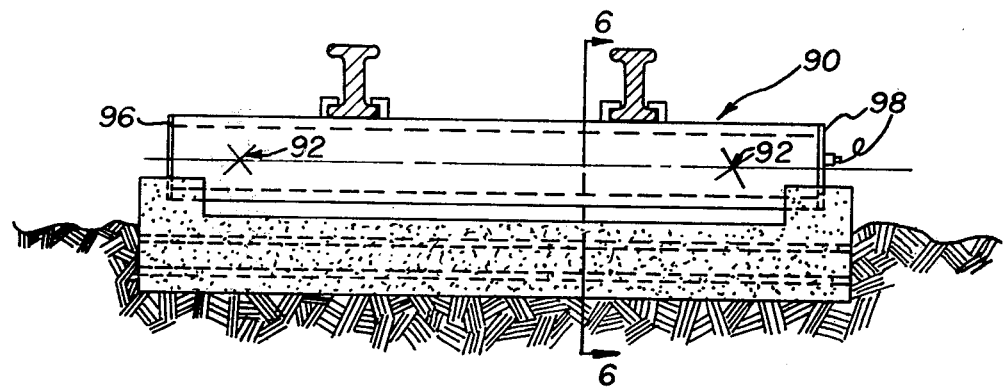
FIG. 5 is a view similar to that of FIG. 3, and illustrating a modified form of weigh device according to the present invention.
Figure 6:
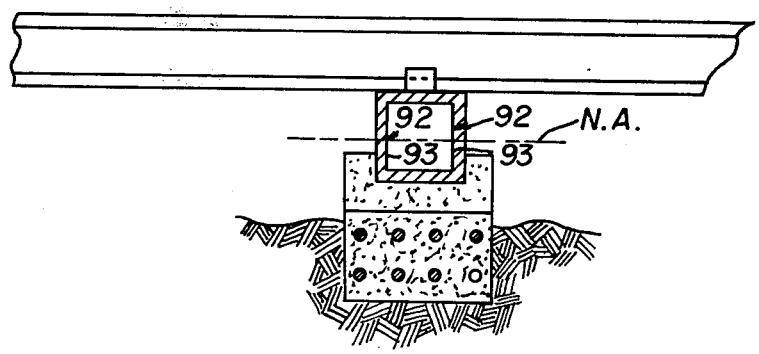
FIG. 6 is a sectional view of the weigh device of FIG. 5, taken from the direction 6—6.

FIGS. 5 and 6 illustrate a modified form of weigh device according to the invention. In FIGS. 5 and 6 a sleeper member 90 is formed as a longitudinally extending tubular member, and pairs of strain sensing members 92 are secured to the inner walls 93 thereof, and along the neutral axis. The ends of the tubular member are sealed by plates 96, 98 welded thereto, and this construction serves to hermetically seal the strain sensing members 92 against ambient conditions. This construction would be recognized as not being quite as perfect stress/strain wise as the I-beam type construction of FIGS. 2-4, but it is believed that this construction is still capable of providing satisfactory indications of the weight of the load supported thereupon.

Figure 7:
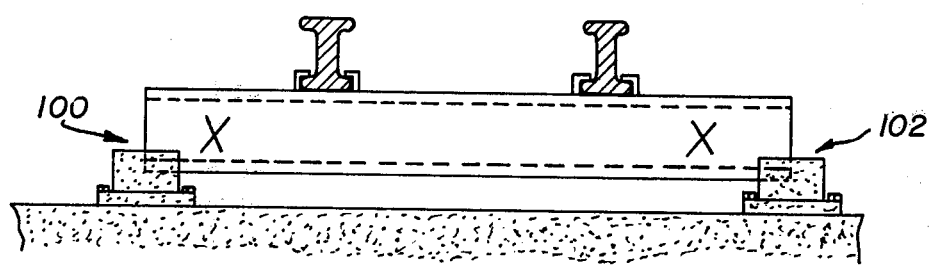
FIG. 7 is a view similar to FIG. 3, and showing another modified form of weigh device according to the invention.

Another modified form of the invention is shown in FIG. 7. A pair of support members 100, 102, formed of metal, concrete, or other suitable material are fixedly secured to a concrete foundation, and each of the support members includes notches similar to those of FIGS. 2-4, so that the plates 100, 102 form structural supports comparable to those described above.

FIGS. 9-10 illustrate further embodiments of this invention. In FIGS. 9 and 10 a pair of elongated support members 106, 108 extend generally parallel to spaced apart rails 110,112 and are disposed outwardly thereof. The longitudinal ends of the elongated support members 106, 108 are fixedly connected with I-beam shaped sleepers 114, 116 which are also fixed to the rails 110, 112. A sleeper member 122 has strain sensing members 124 secured thereto in the manner set forth above. The I-beam sleeper member 122 is disposed equidistantly from the sleeper member 114, 116. Alternatively, a plurality of sleeper members having strain sensing members secured thereto can replace the single sleeper member 122, as shown in phantom lines in FIG. 10. Each elongated member 106, 108 may, if desired, include notches forming support structures similar to those disclosed above for supporting the sleeper members. A weigh system formed as shown in FIGS. 9 and 10 would generally be used for measuring relatively short vehicles.

Referring back to FIG. 1, the weigh section 15 for the torpedo car may be formed by a predetermined length of the rails 14 which are supported by a plurality of strain sensing sleeper members 140. The sleepers 140 may be formed and supported as described above in connection with the embodiments of any of FIGS. 2-7. In FIG. 1 the predetermined length of rails is greater than the distance between the furthest spaced apart wheels of the bogeys 22 and 24, so that the weigh section is longer than the entire length of the torpedo car 13. The rails 14 which extend longitudinally beyond the weigh section 15 are supported on standard (wooden) sleepers 14.

In many instances it is desirable to statically weigh the torpedo car while the car is being filled with molten material. With a weigh section as constructed in FIG. 1 the torpedo car can be readily positioned thereon, and static weighings of the car can be obtained by processing the signals from the plurality of sleeper members.

In the event that the continuous rails 14 form both the weigh section and an additional portion of the standard railway, applicants have recognized that it is necessary to compensate for the fact that vertical deflection of the rails may otherwise tend to introduce erroneous readings into the system as the load will partly be carried also by the wooden sleepers outside the weigh sleepers. As shown in FIG. 11 one way in which the present invention compensates for such deflection of the rails is to provide additional strain sensing members 146 on the rails themselves and at locations near the ends of the weigh section. The vertical deflections in the rails are therefore sensed and are processed along with signals from the members in accordance with known principles to insure the integrity of the system.

Another way in which the present invention compensates for forces which would otherwise be shunted by a continuous rail is to provide a structural discontinuity in the rail near the ends of the weigh sections. Such discontinuity may be provided either by constructing the rails with elastic joints between the weigh section and the remaining rails. Such elastic joints can be constructed in accordance with the principles of U.S. Pat. No. 3,747,715 which disclosure is incorporated herein by reference. Another way of compensating is to provide open joints between the weigh sections and the rails outside of the weigh sections. Either of the latter approaches, however, requires better support for the rails outside of the weigh section than would otherwise be required for a continuous rail. Still another way would be to install additional strain sensing sleeper members outside of the weigh section so that these sleepers provide an indication of forces shunted by the rails.

A still further aspect of this invention may be appreciated by further reference to the embodiment of FIG. 3. The basic embodiment disclosed therein contemplates sensing strain members 77 designed to sense shear strains in the sleeper between the support structure and the rail. An alternative way of sensing strain in the sleeper member 42 would be to sense the bending strain at the center of the sleeper member. Thus, a strain sensing member 150 can be positioned on the sleeper as shown in phantom in FIG. 3, and the bending strain sensed can be processed in accordance with known principles to provide an indication of the force transmitted to the sleeper by the weight of the vehicle.

Weighing of a vehicle in the manner set forth above further provides an improved method of weighing railway supported vehicles such as torpedo cars. According to the method the weight of the vehicle is determined by supporting a length of rail on a sleeper member disposed beneath the rails transverse to the rails and supported outwardly of the rails by support structure which allows deflection thereof under the weight of the rails, and by sensing strain in the sleeper caused by deflection of the rails.

With the foregoing description in mind, it is believed that various obvious modifications thereof will become apparent to those of ordinary skill in the art.

What is claimed is:

1. Apparatus for weighing a rail supported vehicle, said apparatus comprising a pair of spaced apart rails for engaging the wheels of the vehicle and along which the wheels of the vehicle are adapted to roll, at least one longitudinally extending sleeper member comprising a longitudinally extending tubular member extending transversely to and disposed beneath said rails and extending outwardly of both sides thereof, means for supporting the longitudinal end portions of said longitudinally extending tubular member disposed outwardly of said pair of rails and for allowing deflection of said sleeper member in response to forces applied thereto by said rails, and means for providing a signal which varies as a function of the strain in said sleeper member on the inner surface of said longitudinally extending tubular member.

2. Apparatus as defined in claim 1, including means for sealing the longitudinal ends of said tubular member to resist exposure of said means for providing said signal which varies as a function of strain in said sleeper member to ambient conditions.

3. Apparatus for weighing a rail supported vehicle, said apparatus comprising a pair of spaced apart rails for engaging the wheels of the vehicle and along which the wheels of the vehicle are adapted to roll, at least one longitudinally extending sleeper member supporting said pair of rails, said longitudinally extending sleeper member extending transversely to and disposed beneath said rails and extending outwardly of both side thereof, means for supporting the longitudinal end portions of said sleeper member disposed outwardly of said pair of rails and comprising a support structure associated with each of said longitudinal end portions, the support structure associated with each longitudinal end portion including a support surface disposed beneath the respective end portion and slidably engageable therewith, the support structure associated with each longitudinal end portion further including means for resisting movement of the associated longitudinal end of the sleeper member in an outward direction from said pair of spaced apart rails and for resisting lateral movement of the associated longitudinal end of the sleeper member, said means for supporting the longitudinal end portions of the sleeper member allowing deflection of said sleeper member in response to forces applied thereto by said rails, and means for providing a signal which varies as a function of the strain in said sleeper member.

4. Apparatus as defined in claim 3 wherein said means for supporting said sleeper member includes a frame member associated with each longitudinal end portion of said sleeper member, each frame member including a longitudinally extending member disposed outwardly of one side of said rails and extending transverse to said sleeper member, each longitudinally extending member including means for engaging the end portions of the sleeper members adjacent both sides of said sleeper member and disposed outwardly of the respective side of said rails, each longitudinally extending member further including means for supporting the longitudinal end of said sleeper member disposed outwardly of the respective side of said rails.

5. Apparatus as defined in claim 3 wherein a predetermined longitudinally extending section of said spaced apart rails defines a weigh section, a plurality of sleeper members as defined in claim 3 disposed beneath said predetermined section of rails and extending transverse to said rails, means for supporting the longitudinal end portions of each of said sleeper members constructed as defined in claim 3 and disposed outwardly of said pair of rails for allowing deflection of the sleeper members in response to forces applied thereto by said rails, and means associated with each sleeper member for providing a signal which varies as a function of the strain in the sleeper member.

6. Apparatus as defined in claim 5 wherein said spaced apart rails include portions which extend longitudinally outward from both ends of the rails forming said weigh section and form substantially continuous rails therewith, means for providing a signal which varies as a function of strain in said continuous rails disposed on longitudinally extending portions of said pair of rails at or near the longitudinal ends of said predetermined section of rails forming said weigh section.

7. Apparatus as defined in claim 5 including means forming structural discontinuities between the longitudinal section of rails forming said weigh section and the remaining portions of said pair of spaced apart rails.

8. Apparatus as defined in claim 5 wherein a plurality of sleeper members are disposed longitudinally outwardly of said weigh section and extend transverse to said spaced apart rails, and means associated with each of said plurality of sleeper members disposed for providing a signal which varies as a function of the strain in the associated sleeper members.

9. Apparatus as defined in claim 3 wherein said means for providing a signal which varies as a function of the strain in said sleeper member includes strain sensing means disposed between one side of said pair of spaced apart rails and the end portion of said sleeper member disposed outwardly thereof, said strain sensing means providing a signal which varies as a function of the shear strain in said sleeper member.

10. Apparatus as defined in claim 3 wherein said means for providing a signal which varies as a function of the strain in said sleeper member includes strain sensing means located midway between the end portions of said sleeper member and adapted to provide a signal which varies as a function of to the bending strain in the sleeper member.

* * * * *